Dec. 5, 1939.    R. TINKER    2,182,102

POWER STEERING MECHANISM

Filed Jan. 12, 1939    3 Sheets-Sheet 1

WITNESSES

INVENTOR
Ralph Tinker
BY
ATTORNEYS

Dec. 5, 1939.  R. TINKER  2,182,102
POWER STEERING MECHANISM
Filed Jan. 12, 1939  3 Sheets-Sheet 2

WITNESSES  INVENTOR
Ralph Tinker
BY
ATTORNEYS

Dec. 5, 1939.  R. TINKER  2,182,102
POWER STEERING MECHANISM
Filed Jan. 12, 1939  3 Sheets-Sheet 3

WITNESSES
Geo. W. Naylor
A. L. Kitchin.

INVENTOR
Ralph Tinker
BY
Munn, Anderson & Liddy
ATTORNEYS

Patented Dec. 5, 1939

2,182,102

UNITED STATES PATENT OFFICE 2,182,102

POWER STEERING MECHANISM

Ralph Tinker, Fountain City, Wis.

Application January 12, 1939, Serial No. 250,557

4 Claims. (Cl. 180—79.4)

This invention relates to an improved power steering mechanism adapted to be used on tractors or other similar vehicles, an object being to provide an improved construction whereby the vehicles are articulated centrally and one section or part is swung in respect to the other section or part when steering.

Another object of the invention is to provide a steering mechanism for a vehicle that is articulated substantially centrally wherein the parts are so formed that two steering wheels may be used and the driver face in either direction and operate the respective steering wheels to readily steer the vehicle in the same way when using either steering wheel.

A further object of the invention is to provide a steering mechanism and associated parts for a vehicle articulated centrally wherein the operator's platform and part of the mechanism are supported above the articulated connection between the parts of the vehicle.

In the accompanying drawings—

Figure 1:
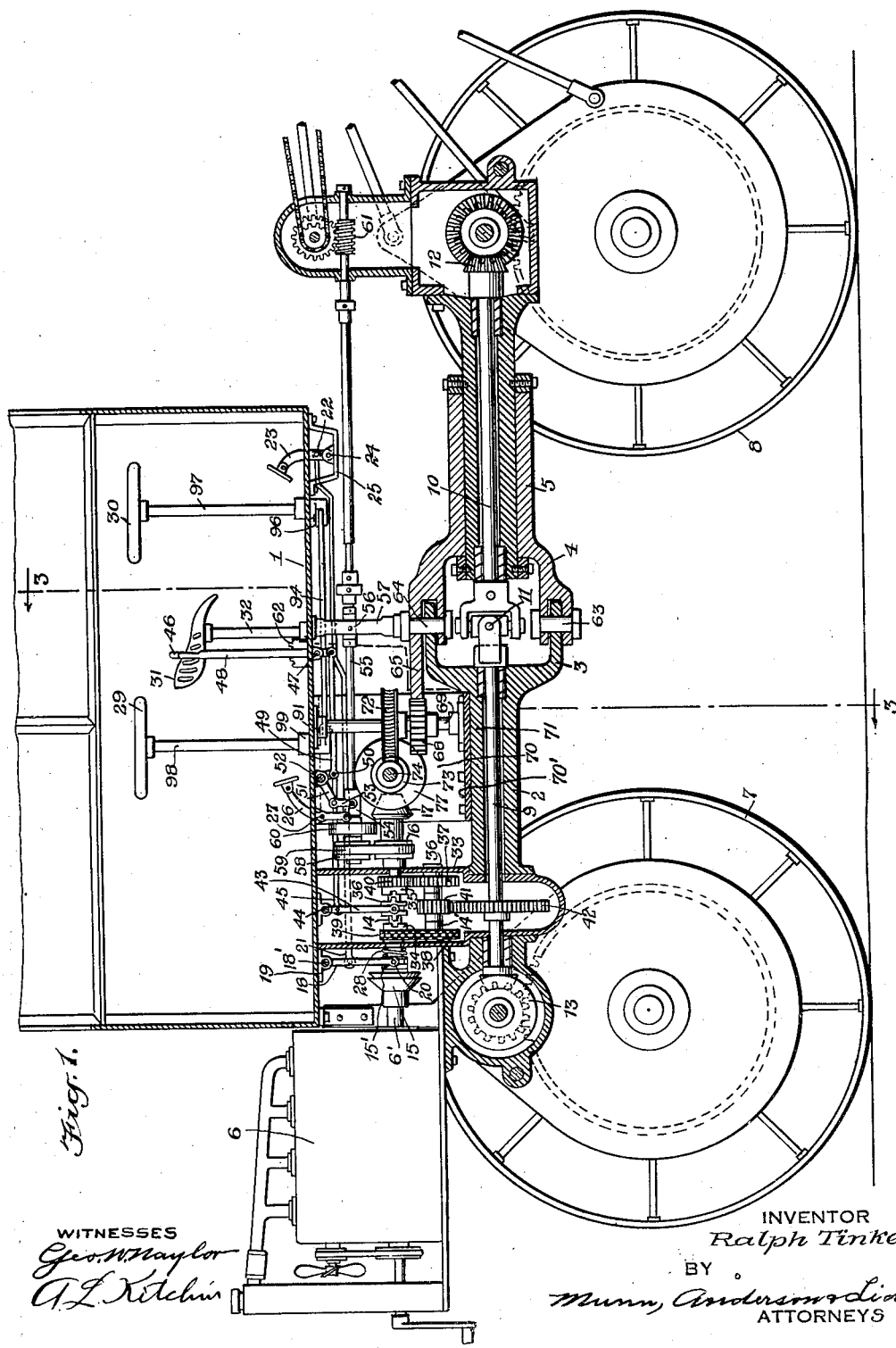
Fig. 1 is a longitudinal vertical sectional view through Fig. 2 approximately on the line 1—1.

Referring to the accompanying drawings by numerals, 1 indicates an operator's platform which is supported on the front frame 2, as hereinafter fully described. The frame 2 is provided with a yoke 3 which coacts with a yoke 4 extending forwardly from the rear frame 5, as shown particularly in Fig. 1. As the vehicle may be driven with equal facility in either direction, either end might be called the front but for the purpose of this description the frame 2 will be considered the front frame as it carries or supports an engine 6 of any desired kind.

The front frame is supported by suitable traction wheels 7 while the rear frame is supported by suitable traction wheels 8. The driving shaft 9 is rotatably mounted in frame 2 while the coacting driving shaft 10 is rotatably mounted in the frame 5, said shafts being connected by a universal joint 11. The shaft 10 is connected to suitable gearing 12 and other transmission devices for rotating the rear wheels 8, as fully disclosed in my Patent No. 2,150,011, issued March 7, 1939, and in my co-pending application Serial No. 208,575, filed May 18, 1938, and, therefore, no additional description is thought to be necessary.

The same is true in regard to the bevel gears 13 and associated parts which drive the front wheels 7. When power is applied to the shaft 9, both shafts 9 and 10 will rotate in the same direction and, consequently, both the front and rear wheels will rotate for propelling the vehicle in the desired direction. When the shafts 9 and 10 rotate in one direction the vehicle travels in a given direction and when these shafts are reversed the vehicle travels in the opposite direction. Means, as hereafter fully described, have been provided for swinging frame 2 in respect to frame 5 for steering purposes through the application of power from the engine 6. Also power from the engine 6 is transmitted to shafts 9 and 10 and associated parts for rotating the respective traction wheels.

As shown particularly in Fig. 1, the crank shaft of the engine is provided with an extension 6' and this extension is connected to the shaft 14 by any desired form of clutch 15. When the clutch 15 is functioning shaft 14 is continually rotated and continually rotates the pulley wheel 16 and the bevel friction gear 17. A depending arm 18 is pivotally mounted at 19 on the platform 1 and extends downwardly so as to engage the pins 20 on the sliding clutch section 15', whereby when the arm 18 is swung in one direction the clutch 15 will be engaged and when swung in the opposite direction the clutch 15 will be disengaged. It will be understood that the clutch section 15' is splined to shaft 14 and by this arrangement the shafts 6' and 14 are connected and disconnected. A link or rod 21 pivotally connected with the arm 18 through shaft 18' and arm 18" extends almost the full length of the platform 1, whereby at its opposite end it is pivotally connected at 22 to a foot lever 23, which foot lever is pivotally mounted at 24 on a bracket 25 bolted or otherwise rigidly secured to the bottom of platform 1. A second foot lever 26 is pivotally mounted at 27 on a suitable bracket carried by the platform 1. The lower end of the foot lever 26 is pivotally connected with the link or rod 21.

When the foot lever 26 is forced toward the engine 6, rod 21 is pulled to the right, as shown in Fig. 1, and the clutch 15 is disengaged. When lever 23 is pushed in a direction away from the motor 6, the same action takes place. The clutch 15 may be of any desired form of clutch, as for instance the kind having a spring, such as spring 28, for forcing the same into functioning position when both of the foot levers have been released. These foot levers are arranged as shown particularly in Fig. 1 in order to coact with the front and rear steering wheels 29 and 30. The seat 31 is carried by a suitable post 32 and is rotatable so that the operator may face either of the wheels 29 or 30 and, consequently, may put his foot on either of the foot pedals or levers 23 or 26.

Figure 2:
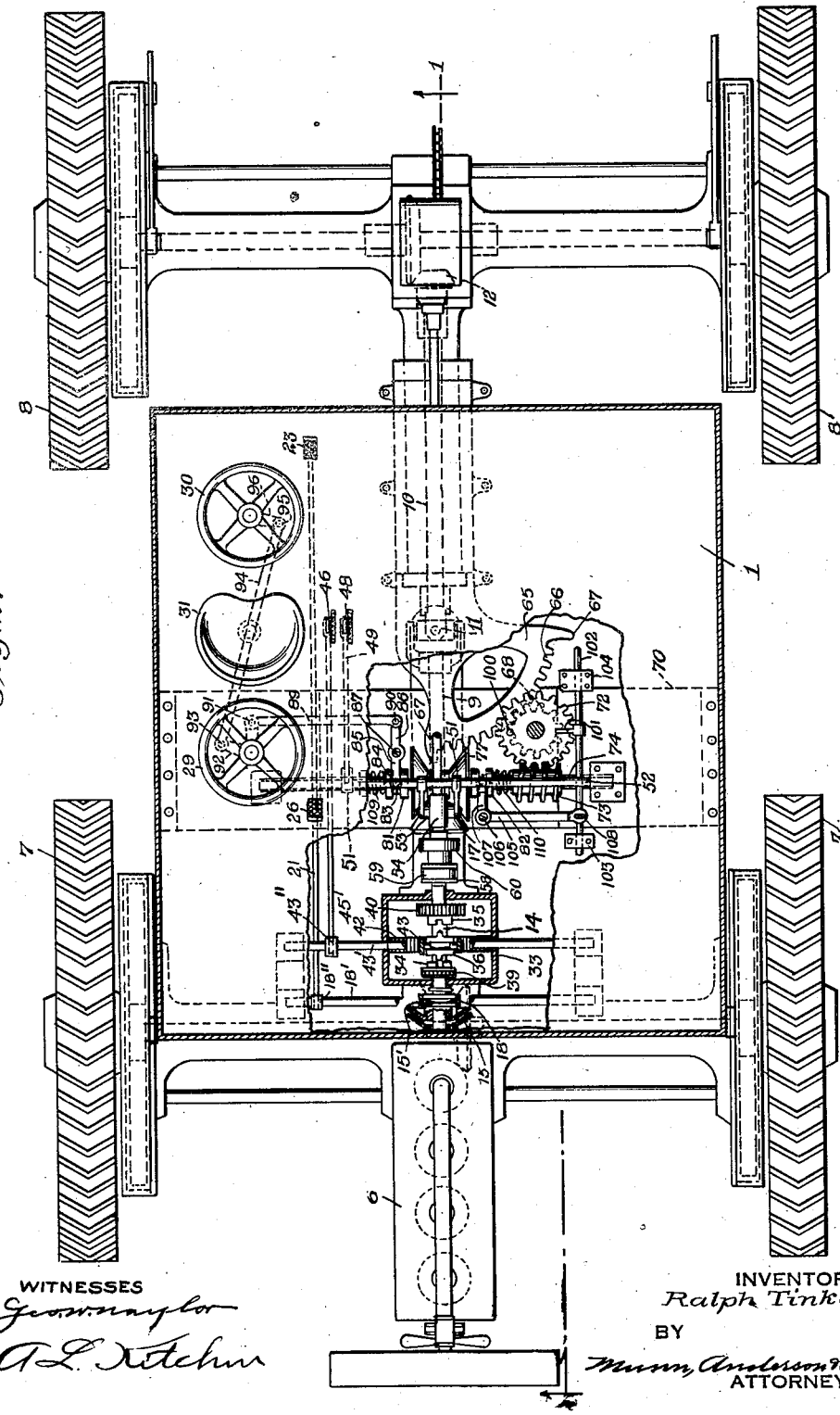
Fig. 2 is a top plan view of a vehicle with a steering wheel embodying the invention applied thereto, certain parts being broken away for better illustrating the detail construction.

A gear housing 33 forms part of the front frame 2, as shown in Fig. 2, and extends upwardly to the platform 1. The shaft 14 extends through this housing and has clutch members 34 and 35 freely rotatably mounted thereon between suitably placed collars fixed on shaft 14. A clutch member 36 splined on shaft 14 is arranged between clutch members 34 and 35 and is adapted to be interlocked with either clutch member according to which direction it is desired to drive the shafts 9 and 10. An auxiliary shaft 14' is carried by the gear housing 33 and has adjacent one end a gear wheel 37 and adjacent the other end a sprocket wheel 38. A chain passes over the sprocket wheel 38 and a sprocket wheel 39 carried by the clutch member 34. A pinion 40 is secured to clutch member 35 and is continually in mesh with the gear wheel 37. A second pinion 41 rigidly secured to shaft 14' is in continuous mesh with a large gear wheel 42 which is rigidly secured to shaft 9. When it is desired to drive shaft 9 in one direction the splined clutch member 36 is moved into engagement with the clutch member 34 and when it is desired to reverse the rotation of shaft 9 the splined clutch member 36 is moved into engagement with clutch member 35. An arm 43 is pivotally mounted at 44 from platform 1 and is operatively connected with the splined clutch member 36 to slide this clutch member back and forth as desired. A link or rod 45 pivotally connected with the arm 43 through shaft 43' and arm 43", extends rearwardly to a position opposite the seat 31 where it is pivotally connected to the lower end of a hand lever 46. The hand lever 46 is pivotally mounted at 47 on a suitable bracket carried by platform 1. A second hand lever 48 is arranged in line with the hand lever 46 and is pivotally mounted at 47 so that the lower end may be pivotally connected with a link 49 which extends forwardly and is pivotally connected at 50 to a bell crank lever 51, which bell crank lever is pivotally mounted on a suitable shaft 52 carried by suitable brackets secured to the platform 1. The bell crank lever 51 is pivotally connected with a link 53 which is bifurcated at its lower end and the bifurcated part pivotally connected with a sleeve 54 slidingly mounted on shaft 55. This shaft is pivotally mounted at 56 on a standard 57 and carries at the forward end a pulley 58 for accommodating a belt 59. Also a friction wheel 60 is connected to shaft 55 and when lowered frictionally engages the rear end portion of the shaft 14 so as to rotate shaft 55 in one direction. When the friction wheel 60 is raised belt 59 will function to rotate shaft 55 in the opposite direction. Members 55 up to 60 are disclosed in my co-pending application, Serial No. 208,575 and, therefore, will not be claimed in the present application, nor be further described except to state that the shaft 55 is adapted to operate the worm 61 and thereby actuate certain mechanism to be connected to the vehicle at the rear, as for instance a cultivator. It will be seen, therefore, that lever 48 controls the direction of rotation of the shaft 55 and by correctly positioning the same the shaft may be maintained stationary. Lever 46, however, controls the position of the splined clutch member 36. If desired, a suitable pawl-and-rack 62 could be provided for each of the levers 46 and 48 to hold them in any desired adjusted position.

It will be noted that the arm 18 is connected with the shaft 18', which extends transversely of the device and is journaled in suitable brackets 19 carried by the platform 1. This permits the rod 21 to be positioned at one side of the center of the device and yet present a structure whereby the clutch may be shifted as desired. The same is true in regard to the arm 43 which is rigidly secured to the shaft 43'. The depending arms 18 and 43 are arranged centrally of the vehicle so as to depend directly on the clutch 15 and the splined clutch member 36, while the rods 21 and 45 are at one side as clearly shown in Fig. 2. From Fig. 2 it will also be seen that the operator while seated on the seat 31 may operate levers 46 and 48 when facing either direction and when facing in one direction operate pedal 23 and wheel 30, while the wheel 29 and pedal 26 may be readily operated when facing in the opposite direction.

As shown in Fig. 1, the frames 2 and 5 are articulated or pivotally connected together by the use of yokes 3 and 4 held in place by aligned pins 63 and 64. The yoke 4 at the upper part is provided with an extension 65 which, as shown in Fig. 2, is provided with an arc-shaped rack 66 and at each end of the rack there is provided an outwardly extending tooth 67 so as to prevent movement of the pinion 68 beyond the end of the rack. As the rack 66 with the extension 65 is swung by the pinion 68, the frames 2 and 5 will be moved at an angle to each other and this angular relation will cause the vehicle to travel around a curve or in any desired direction as required by the operator seated on the platform 1.

The friction gear 17, rack 66 and parts therebetween coact to transmit power to yoke 4 so as to produce a desired angular relation between the frames to secure the desired steering action. The shifting of the frames in respect to each other around the axes of the pivot pins 63 and 64 is usually carried out while shafts 9 and 10 are rotating.

Figure 3:
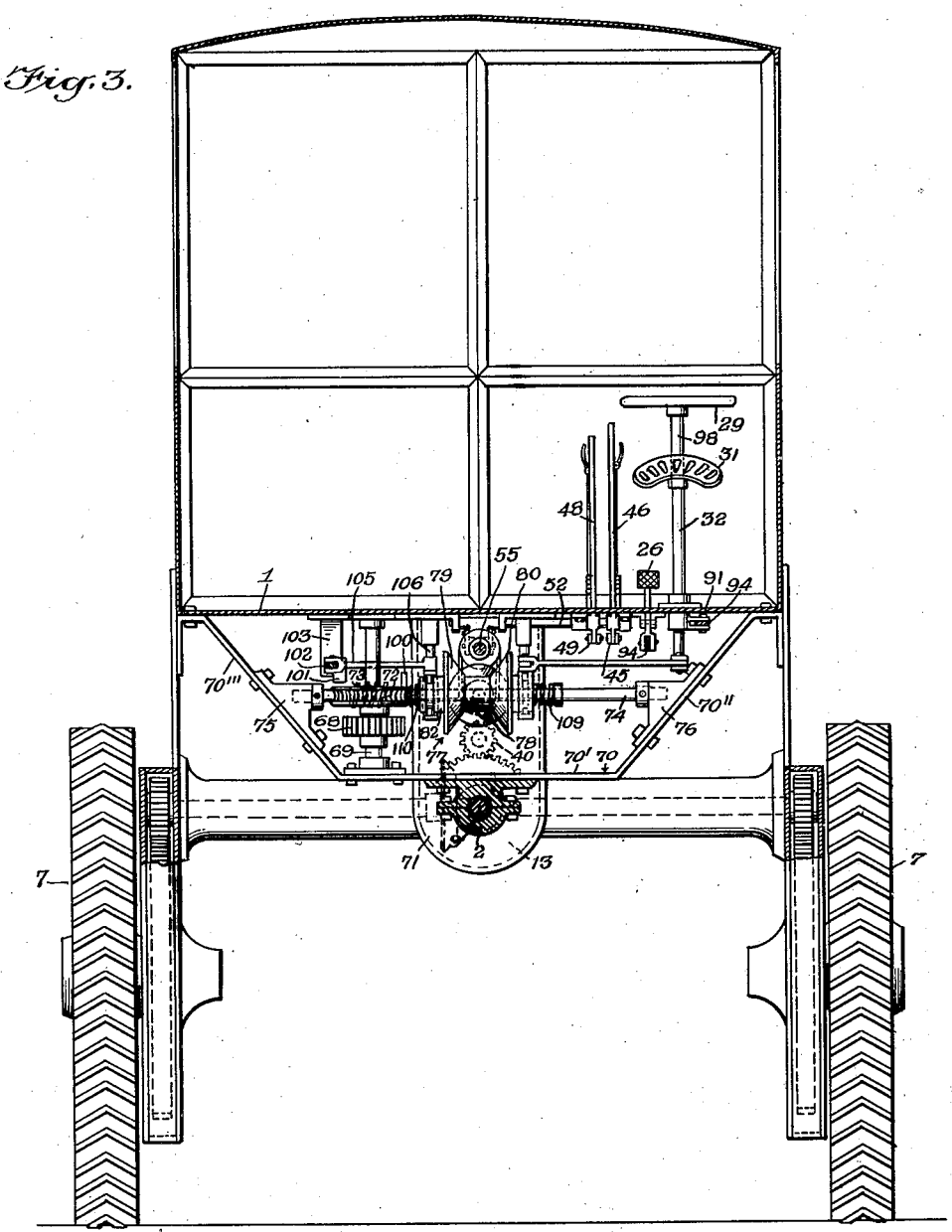
Fig. 3 is a sectional view through Fig. 1 approximately on the line 3—3.

From Figs. 1 and 2 it will be seen that pinion 68 is rigidly secured to a vertically extending shaft 69 mounted in suitable bearings to the platform 1 and on the top side of the supporting yoke 70. This supporting yoke, as shown in Fig. 3, is a flattened U-shaped structure with the bottom section 70' bolted or otherwise rigidly secured to the enlargement 71 of the front frame 2. The bottom section 70' merges into upwardly extending sections 70" and 70''', which are bolted or otherwise rigidly secured at their upper ends to the platform 1. The supporting yoke 70 is comparatively wide, as shown in Fig. 1, and supports shafts 74 and 69 and a number of other parts, as illustrated in Figs. 1 and 3.

Referring again to the shaft 69, not only is the pinion 68 rigidly secured thereto but also the worm wheel 72 which continually meshes with the worm 73. Worm 73 is rigidly secured to shaft 74 journaled in suitable bearing brackets 75 and 76, as shown in Fig. 3. On shaft 74, centrally thereof, is mounted a friction spool 77 having a central section 78 and friction gear sections 79 and 80, said gear sections facing each other. These parts are arranged so that when the structure 77 is in its central or neutral position the bevel friction gear 17 will be spaced midway between the friction gears 79 and 80, as illustrated in Fig. 3. The friction spool 77 is splined to shaft 74 so that whenever the friction gear 17 is out of contact therewith, wheel 72 and associated parts, including the extension 65, will remain stationary. It is only necessary to shift the friction spool 77 one way or the other to engage the friction gear 17. It will be understood that as long as clutch 15 is functioning and the engine is operated, the bevel friction gear 17 will be rotated.

The friction spool 77 at one end is provided with a hub 81 and at the other end with a hub 82. These hubs are provided with suitable grooves, as shown in Fig. 2, and in each groove there is a slip ring 83 having suitable pins 84. The pins 84 of hub 81 are rotatably mounted in the bifurcated end 85 of a lever 86, which lever is pivotally mounted at 87. A link 89 is pivotally connected at 90 to the outer end of lever 86. This link is also pivotally connected at 91 to one end of a bell crank lever 92, the opposite end being pivotally connected at 93 to a connecting link 94, which in turn is pivotally connected at 95 to an arm 96. Arm 96 is rigidly secured to a post 97 journaled in a suitable bearing of platform 1 and rigidly secured to the steering wheel 30. Bell crank lever 92 is rigidly secured to a post or stem 98 which is rigidly secured to the steering wheel 29. Post 98 is rotatably mounted in a suitable bearing 99 carried by the platform 1. This general arrangement is shown in Fig. 2 and by reason of the diagonal position of the link 94, the steering wheels operate in unison but permit the usual turning of the respective steering wheels when facing in either direction.

When the operator is facing to the rear, as shown in Fig. 2, the rotation of steering wheel 30 clockwise will turn the vehicle to the right. If the operator were facing in the opposite direction and operating the steering wheel 29, a turning of the steering wheel clockwise would turn the vehicle to the right. When either of the steering wheels 29 or 30 is turned hub 81 will be pulled or pushed, as the case may be. If the turning movement is such as to push hub 81, the friction spool 77 will be moved accordingly and one of the friction gears 79 or 80 will be engaged with friction gear 17, but if the hub 81 is moved in the opposite direction the opposite friction gear will be engaged. In this way the friction spool with its shaft 74 may be rotated in either direction to any desired extent. This statement, however, is limited by the fact that the extending teeth 67 will limit excessive movement in either direction and also certain other mechanism hereinafter fully described will limit movement in either direction.

The worm gear 72 is provided with an upstanding pin 100 which coacts with a pin 101 rigidly secured to a slide rod 102 carried by suitable brackets 103 and 104, as shown in Fig. 2. A bell crank lever 105 is pivotally mounted at 106 on a suitable support carried by the platform 1 and has a bifurcated end 107 fitting into the hub 82, while the opposite end, at 108, is formed with a slot accommodating a pin extending from the slide rod 102. As the pinion 68 nears either end of the rack 66, pin 100 will strike pin 101 and move the slide rod 102. If the pin 100 is moving clockwise, as shown in Fig. 2, the result will be that the hub 82 and friction spool 77 will be pulled so as to move out of engagement with the friction gear 17. If the pin 100 is moving counterclockwise the reverse action will take place and hub 82 will be pushed for disconnecting the friction spool from the gear 17. As this action is produced by power from the engine through the various mechanisms heretofore described, the connection between gear 17 and the friction spool will be broken notwithstanding the action of the operator in respect to the steering wheels 29 and 30. However, this action will not bring the frames 2 and 5 back into alignment but will merely prevent these frames from turning more than a certain angle with respect to each other. The respective frames and associated parts of the vehicle will remain at their extreme angular position until the operator moves either of the steering wheels to change the angle to a straight line.

It will be noted, particularly from Figs. 2 and 3, that springs 109 and 110 are positioned to surround the shaft 74 and act to center the friction spool 77 whenever permitted to do so.

While I have illustrated and described what I believe to be a preferred embodiment of my invention, it is obvious that various changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. A power steering mechanism for a vehicle including a pair of wheel supported frames, said frames at the adjacent ends being pivotally connected, a transverse shaft supported by one of said frames, a friction spool splined to slide on said shaft, a power driven friction pulley positioned between the ends of said spool and normally out of engagement with the spool, a pair of spaced steering posts on the frame arranged on a longitudinal line, means operatively connecting both of said steering posts to the friction spool to move the same longitudinally of its shaft to have its ends engage at different times said friction pulley, said means including a link motion structure including a bell-crank lever secured rigidly to one of said wheels, an arm secured to the other wheel, a link connecting said arm with one arm of said bell-crank lever, and means including a second link connecting the other arm of said bell-crank lever with said spool, a toothed segment fixed to one of said frames, a pinion carried by the other frame continually in mesh with said segment and means for transmitting motion from said spool to said pinion when said friction gear is rotating said spool.

2. A power steering mechanism for a vehicle including a pair of articulated wheel supported frames, an operator's platform, a substantially U-shaped support for said platform having flat sides extending at an angle to the horizontal, means for securing said U-shaped support to one of said frames, a transverse shaft supported by said flat sides, a friction spool splined to slide on said shaft, a power driven friction gear positioned between the ends of said spool and normally out of contact therewith, a pair of steering posts rotatably mounted on said platform, means operatively connecting both of said steering posts to the friction spool to move the same longitudinally of said shaft, a toothed segment fixed to the other of said frames, a vertical shaft having its upper end respectively rotatably journaled to said platform and its lower end journaled to the top of said U-shaped support, a pinion secured to said vertical shaft positioned to continually mesh with said toothed segment, a worm wheel secured to said vertical shaft, and a worm in mesh with said worm wheel secured to the shaft on which said spool is mounted whereby said toothed segment will be moved in either direction according to which end of said spool is engaging said friction gear.

3. A power steering mechanism for a vehicle including a pair of wheel frames pivotally connected together at their adjacent ends, one of said frames having a toothed segment and the other a widened section on top, an operator's platform, a substantially U-shaped frame having its center secured rigidly to said widened section and its top secured to said platform for supporting the platform, a pinion above said widened section continually meshing with said toothed segment, a vertically positioned shaft rigidly secured to said pinion rotatably journaled on said platform and said U-shaped support, a worm wheel rigidly secured to said vertical shaft, a horizontally positioned shaft rotatably supported by said U-shaped support, a worm rigidly secured to said horizontal shaft positioned to be continually in mesh with said worm wheel, a friction spool splined to slide longitudinally on said horizontal shaft, a power driven friction pinion positioned between the ends of said spool and normally out of contact therewith, a pair of steering posts carried by said platform, and means for operatively connecting said posts with said spool for moving the spool longitudinally on said horizontal shaft and into and out of mesh with said power driven friction gear.

4. In a power steering mechanism for a vehicle, a sliding friction spool, a pair of steering posts and means for transmitting motion from said posts to said spool for moving the spool in either of two directions, said means including an arm rigidly secured to one of said posts, a bell-crank lever secured to the other of said posts, a link connecting said arm with one leg of said bell-crank lever, said arm extending from the opposite side of the first mentioned post to the associated leg of said bell-crank lever whereby the posts rotate in unison but in opposite directions, and means including a link for connecting the other leg of said bell-crank lever to said friction spool.

RALPH TINKER.